April 7, 1970  C. R. RODEWALT  3,504,533

VIBRATION INDICATOR

Filed Nov. 13, 1967

INVENTOR
CHARLES R. RODEWALT
BY James J. Mullen
ATTORNEY

United States Patent Office 3,504,533
Patented Apr. 7, 1970

3,504,533
VIBRATION INDICATOR
Charles R. Rodewalt, 3123 Ronald Drive,
St. Ann, Mo. 63074
Filed Nov. 13, 1967, Ser. No. 682,367
Int. Cl. G01n 1/00
U.S. Cl. 73—71                                   1 Claim

ABSTRACT OF THE DISCLOSURE

A vibration indicator which is used in the detection of static and dynamic unbalance in a rotating body comprises a spiraled shaped element, means to affixably support said element at one end thereof, a weighted member detachably affixed to the opposite end of said member and an interior longitudinally extending damper such that the reciprocal longitudinal movement of said damper with relation to the spiral element can reduce (or increase) the sensitivity of the vibrating spiraled shaped element.

---

The present invention relates in general to a novel apparatus for determining both the static and dynamic unbalance of a nonaligned object which generates vibrations and more particularly relates to an apparatus for the optical sensing of nonalignment of rotating bodies.

It is to be understood that the term "nonalignment" or "nonaligned" as used herein, is used in a broad sense and connotates the static and/or dynamic unbalance of a moving body.

In the past the prior art has recognized the problem of ascertaining the nonalignment of a moving object such as a rotating body by various types of apparatuses as exemplified in U.S. Patents 1,467,373, 1,641,447, 1,658,183, 1,673,949, 2,301,291, 2,428,671, 2,543,573, 2,798,379, 2,818,830, 3,012,468 and 3,203,230. The aforementioned U.S. patents, all of which are incorporated herein by reference, disclose devices for detecting vibrations generated by a nonaligned rotating body. The disadvantages of the prior art devices, as represented by the aforementioned patents, is generally due to the fact that such devices are (1) expensive in construction, (2) mechanically too complex to be readily available to and usuable by the average consumer, and (3) incapable of permitting both static and dynamic unbalance of a nonaligned rotating body to be determined. It is to be noted, for example, that in the detection of a nonaligned automobile wheel, there is no simple and economical device which permits a determination of both the static and dynamic unbalance thereof; note, for example, in addition to the aforementioned patents, U.S. Patents 3,008,327, 3,130,587 and 3,164,994. These latter-mentioned publications, all of which are incorporated herein by reference, disclose costly and complex devices for measuring, determining, and/or correcting the nonalignment of an automobile wheel. Consequently, the devices disclosed in the aforementioned patents can readily be seen to have inherit disadvantages and that the prior art has greatly needed a simple and inexpensive device for ascertaining both the static and dynamic unbalance of a rotating body such as an automobile wheel. The novel apparatus of the present invention, herein referred to as a vibrascope, overcomes the deficiencies and disadvantages of the prior art apparatuses and provides an inexpensive and simple device for accomplishing the desired results heretofore set forth.

In conjunction with the description set forth herein, it is to be understood that while the vibrascope is generally described with reference for use in detecting and aiding in the correction of the nonalignment of an automobile wheel, such apparatus may also be used in a variety of places for accomplishing the results heretofore set forth. For example, the vibrascope can be utilized in determining the nonalignment or unbalance of a washing machine, refrigerator, fan, turbine, and the like. In view of the appended drawing and subsequent description, it can readily be seen that the novel apparatus of the present invention has a variety of uses.

Accordingly, one object of the present invention is to provide a novel apparatus for the detection of both the static and/or dynamic unbalance of a moving object.

A further object of this invention is to provide an apparatus of simple and inexpensive construction and one which can be readily utilized by the average consumer.

These and other objects will become apparent from reading the following description of the invention, wherein reference is made to the appended drawing in which.

The appended drawing and subsequent description of the specific and preferred embodiments of the present invention are intended to be illustrative and not limited, and changes may be made in the specific constructual details herein illustrated and described without departing from the scope and spirit of the appended claims.

Figure 1:
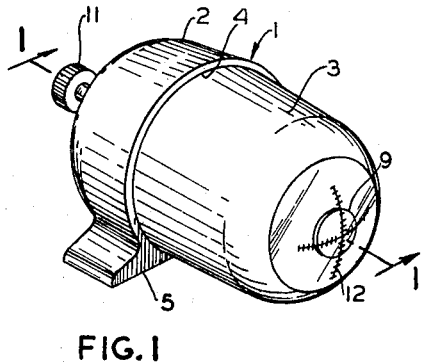
FIGURE 1 is a perspective view of a vibrascope showing the exterior portion thereof.
Figure 2:
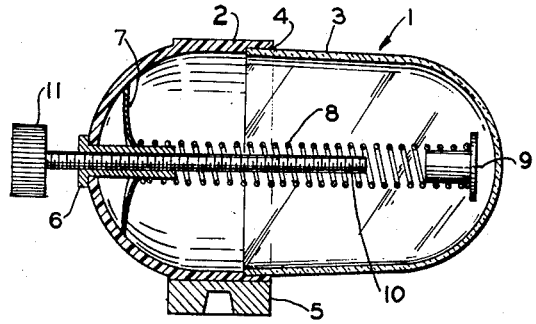
FIGURE 2 is a cross-sectional longitudinal portion taken along lines 1—1 of FIGURE 1.
Figure 3:
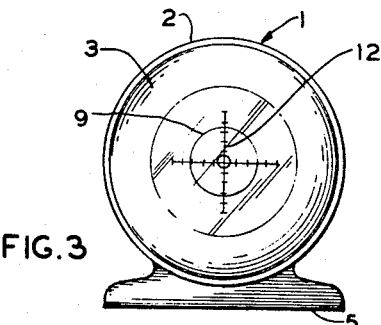
FIGURE 3 is a front view of FIGURE 1.

Referring more specifically to the drawing, FIGURES 1, 2 and 3 represent one preferred embodiment of the novel apparatus of the present invention. The vibrascope 1 shown in FIGURES 1, 2 and 3 comprises a housing which consists of two members 2 and 3 which interconnect with each other at 4 around the outer circumferential surface of member 3. The housing itself is supported by base 5 which may be, for example, a magnet or suction cup (which is hereinafter more specifically described and shown in FIGURE 4). While members 2 and 3 of the housing are shown to be an extended semisphere, it is to be understood that the cross-section thereof is not confined to a circle but can have a curvilinear perimeter other than a circle, such as elliptical or ovoid. Furthermore, the cross-section of these members, instead of being curvilinear, can be polygonal, e.g., triangle, rectangular, hexagonal, octagon, and it is not necessary that the polygonal figure be equilateral. Furthermore, the cross-section of such members can be a combination of curvilinear and straight sections; however, a circular cross-section is preferred.

Referring to housing member 2, it will be noted that a hollow, cylindrically shaped, internally threaded nipple or coupling 6 extends through the wall thereof. The coupling 6 in turn is supported within member 2 by detachable bracket 7 which closely surrounds the outer circumferential surface thereof. Couple 6 is restricted from moving through the hole in member 2 and into the interior portion thereof by means of a flange on one end of said couple and which flange is outside of member 2. Surrounding the opposite end of couple 6 is a spiraled shaped element 8, which extends substantially the full longitudinal distance of the interior portion of the housing. On the opposite end of the spiraled shaped element 8 is positioned member 9 which is partially positioned in the interior of the spiraled shaped element 8. The exterior diameter of member 9 is of such magnitude that it fits snugly or closely into the interior portion of element 8 and thus is prevented from being removed therefrom due to the vibrations which element 8 undergoes when detecting the nonalignment of an object which generates such vibrations. While member 9 is shown in FIGURE 2 to be of a cylindrical shape with a flange being positioned at one end thereof, it is to be understood that such member can be of any configuration or design, e.g., a triangle, rectangle, as long as it can be physically attached to the end of element 8. Furthermore, the weight of member 9 is of such magnitude so as to cause element 8 to vibrate. In other words, the weight of member 9 is correlated with the elasticity of the spiraled shaped element 8 in order that element 8 can function effectively as an optical indicator for sensing vibrations of an object when the vibrascope is placed thereon. While various materials of construction can be used to fabricate the spiral element, it is preferred that such element be constructed of steel.

When any object, which is being tested for non-alignment, creates severe vibrations, the sensitivity of the spiraled shaped element 8 can be increased or decreased according to the position of member 10 (e.g., a bolt) which extends through coupling 6 and into the interior longitudinal area of element 8. In other words, when member 10 is fully retracted via wheel 11 and is positioned substantially outside of member 2, the sensitivity of element 8 is at its greatest. By the same token, when member 10 is reciprocally rotated to extend into the interior longitudinal portion of element 8, the sensitivity of the spiraled shaped element 8 is substantially reduced. In essence then, member 10 provides a unique way for reducing or increasing the sensitivity of the spiraled shaped element 8.

In conjunction with FIGURES 1 and 3, there is positioned on the front portion of housing member 3 a "cross-hair" which permits the visual observation and optical detection of the position of member 9 when moving. The cross-hair enables one to detect the magnitude of the swing or reciprocal movement (generally either in a longitudinal or latitudinal direction) of the spiraled shaped element 8. Consequently, when element 8 is relatively steady or in the middle of the cross-hair, this shows that the correction of the nonaligned object (which generated the vibrations) has been completed.

Figure 4:
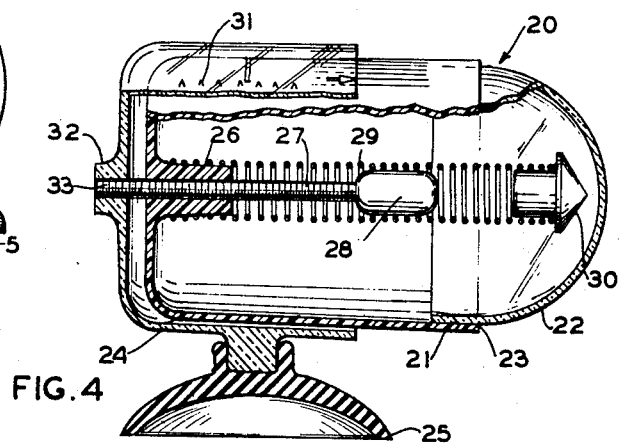
FIGURE 4 is another embodiment of the present invention showing a longitudinal cross-section of a vibrascope.

Referring more specifically to FIGURE 4 which is another embodiment of the novel apparatus of the present invention, vibrascope 20 comprises a housing comprising members 21 and 22 which are connected at 23 which is located around the outer circumferential surface of member 22. The housing members 21 and 22 are in turn supported by a second housing 24 which partially encloses member 21. This housing 24 is detachably affixed to an object by means of base 25 which, in this instance, is shown as a suction cup; however, a magnet and the like will function in the same manner.

Referring more specifically to member 21, it will be noted that protruding from the interior portion thereof is a hollow, cylindrically shaped, interior threaded nipple 26 which supports threaded member 27. Member 27 can consequently be reciprocally rotated into and out of the interior portion of element 29. Closely fitted around the exterior portion of nipple 26 is a spiraled shaped element 29 which extends substantially the full longitudinal distance of the housing which comprises members 21 and 22. Located on the opposite end of the spiraled shaped element 29 is a weighted member 30 which is in the form of a cylindrically shaped body having an end portion which is in the shape of a cone which has a base whose diameter extends beyond the diameter of member 30. In conjunction with housing members 21 and 22, it will be noted that members 21 and 22 rotate within the interior of housing 24 in order to permit one to ascertain the frequency of vibrations of element 29. More specifically, the graduations 31 on housing 24 and member 21 give an indication of the frequency of vibrations of element 29.

Referring again to member 27, it will be noted that this member can be reciprocally rotated into and out of the interior portion of element 29 by means of screw 33 positioned in the end portion 32 of housing 24. On the opposite end of member 27 is an enlarged portion 28 which has an external diameter slightly less than the internal diameter of element 29. Thus member 28 acts like a damper and creates a greater sensitivity in the reduction of the vibrating member 29 when the object to which vibrascope 20 is attached undergoes acute and/or severe vibrations and which could not be registered on or determined by scale 31.

Figure 5:
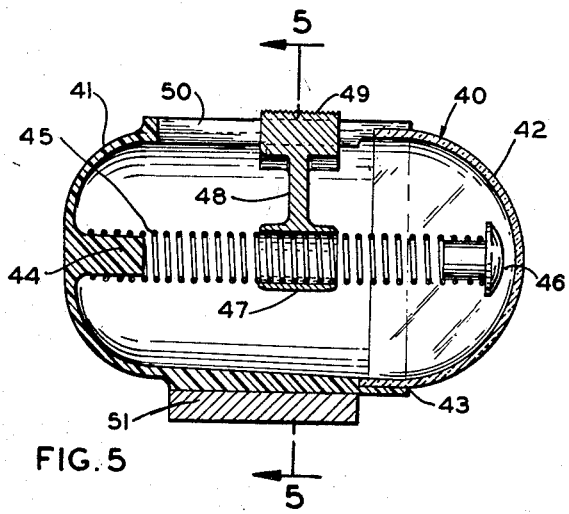
FIGURE 5 is still another embodiment of the present invention showing a cross-sectional view of a vibrascope.
Figure 6:
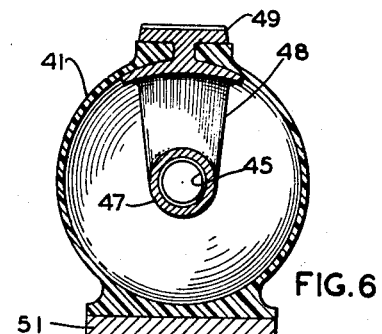
FIGURE 6 is a longitudinal cross-sectional view taken along lines 5—5 of FIGURE 5.

Referring now more specifically to FIGURES 5 and 6, there is shown a vibrascope 40 which is still another embodiment of the present invention comprising a housing having members 41 and 42 interconnected at 43 to form a substantially enclosed envelope. Housing member 41 has on the interior wall a protruding nipple 44 which is, for example, cylindrically shaped. Surrounding part of the exterior portion of nipple 44 is a spiraled shaped element 45 which extends substantially the full length of the longitudinal portion of housing members 41 and 42. At the opposite end of the spiraled shaped element 45 is a weighted member 46 which has the same functional purposes as heretofore set forth in conjunction with weighted member 9 and 30, respectively shown in FIGURES 2 and 4. In order to increase or decrease the sensitivity of the spiraled shaped element 45, there is provided sleeve 47 which encompasses a portion of the exterior of element 45. Such sleeve 47 is adapted to be reciprocally moved over the exterior portion of element 45 in order to increase or decrease the sensitivity thereof. Thus sleeve 47 functions in a similar manner as members 10 and 27 shown respectively in FIGURES 2 and 4. While sleeve 47 is shown to be a cylindrically shaped member, it is to be understood that other types of configurations can be utilized; furthermore, the sleeve need not be a complete circle in cross-section, i.e., need not be completely encompassing element 45, as long as a significant portion, e.g., a 270° arc, thereof surrounds and contains the element and thus causes said element 45 to undergo a reduction in sensitivity of the vibrations picked up from the vibrating object. Sleeve 47 in turn is attached to a sliding member or button 49 by means of support member 48. Slide member 49 moves in a longitudinal direction substantially parallel to element 45 and thus permits one to move sleeve 47 by means of sliding member 49 back and forth in slot 50 which in turn is located in the top wall portion of housing member 41. Slide member 49 is more specifically shown in cross-section in FIGURE 6; it is to be understood, of course, that various modifications of this configuration of the slide member or button-sleeve combination can be undertaken, all of which are within the scope of the present invention. Vibrascope 40 has its members 41 and 42 supported by a base 50 which, in this instance, is a magnet. Thus vibrascope 40 can be attached to a metallic vibrating object such as a car fender by means of magnet 51.

Referring now more specifically to the operation of the vibrascopes designated 1, 20 and 40 in FIGURES 1 through 6, the object which is to be tested or be subjected to vibrations (such as a fender of a car which picks up said vibrations due to the nonalignment of a rotating wheel) has such a vibrascope placed thereon in a position which is convenient for the person correcting the non-aligned wheel to simultaneously observe the vibrascope and wheel while making the necessary alignments thereto. For example, when the front end of an automobile is to be aligned in order, for example, to prevent "shimming" when operated at high speeds, the vibrascope is positioned on that portion of the car body which enables the individual correcting the nonaligned wheels to observe the vibrating spiral member-weighted member. In such a case and as the necessary mechanical corrections to the wheels of the automobile are made, the amplitude or "swing" of such vibrating member will be reduced or shortened. When such vibrating member is substantially in the center of the aforesaid "crosshair," this will optically indicate that the object is in good static and dynamic balance. It is to be understood that when a housing is employed to encompass the vibrating spiral element, the front portion of the vibrascope should be transparent in order that the weighted member may be readily observed. As a practical matter, the housing heretofore described such as members 2, 3, 21, 22, 24, 41 and 42 may be totally constructed of a transparent type material. By the same token, it is also within the scope of the present invention that such members, excluding the front portion thereof, can be constructed of metals, for example, structural steel, galvanized iron, stainless steel, copper, aluminum; glass, glass-on-steel, ceramic-on-steel, polyester-glass fiber; or epoxy, phenolic, melamine resins, and the like.

While the vibrascope heretofore described and shown in FIGURES 1-6 has a base such as a magnet or suction cup, it is also within the scope of the present invention that other types of support means can be utilized to affix the vibrascope to a vibrating object. For example, the base can consist of a flat piece of material which has holes or perforations therein thus permitting the vibrascope to be detachably affixed to the object by means of nuts and bolts, screws, and the like.

While the particular embodiments of the present invention have been shown and described, it will be obvious to those skilled in the art that changes and modifications may be made without departing from the invention in its broader aspects.

It is to be understood that the appended claim also constitutes a part of the description of the vibrascopes of the present invention and are to be considered as such.

I claim:

1. A device for indicating vibrations of an object comprising (a) a spiraled shaped, generally tubular element; (b) a first housing which encloses a substantial portion of said device and which comprises two separate and individual members; (c) means to fixably support said element at one end thereof and which comprises a cylindrically shaped nipple protruding from a portion of the wall of said first housing, said nipple having an external diameter which permits at least a portion of said spiraled shaped element to be closely fitted therearound and internal screw threads; (d) a weighted member detachably affixed to the opposite end of said elements; (e) means for changing the sensitivity of said device and which comprises a longitudinally extending member, said member threaded within said nipple and extending within the internal portion of said spiraled shaped element and is provided on one end thereof with a damper which has a diameter which is greater than the diameter of said member; (f) said first housing being partially encompassed by a second housing to which said longitudinally extending member is attached and which is adapted to rotatably support said first housing; and (g) means to detachably affix said second housing to said object; said device when attached to said object causing the spiraled shaped element to vibrate for indicating the vibrations of said object.

References Cited

UNITED STATES PATENTS

| | | | |
|---|---|---|---|
| 2,241,637 | 5/1941 | Ernst et al. | 73—458 |
| 2,561,342 | 7/1951 | Collins et al. | 200—61.45 XR |
| 2,702,883 | 2/1955 | Petroff et al. | 73—71.2 XR |
| 2,791,653 | 5/1957 | Haberland | 200—61.45 XR |
| 3,002,062 | 9/1961 | Globe | 73—71.2 XR |
| 3,183,512 | 5/1965 | Castle | 346—7 |
| 3,321,960 | 5/1967 | Bjorn | 73—71.4 |
| 3,363,470 | 1/1968 | Yavne | 73—515 |

JAMES J. GILL, Primary Examiner